United States Patent [19]

Richmann et al.

[11] Patent Number: 5,885,413

[45] Date of Patent: *Mar. 23, 1999

[54] DEINKING WASTEPAPER CONTAINING ELECTROSTATIC PRINTED INK USING BRANCHED ALCOHOL ALKOXYLATE SURFACTANT

[75] Inventors: Sandra K. Richmann, Jacksonville Beach; Frank J. Sutman, Jacksonville, both of Fla.

[73] Assignee: BetzDearborn Inc., Trevose, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 749,873

[22] Filed: Nov. 15, 1996

[51] Int. Cl.$^6$ ........................................................ D21C 5/02
[52] U.S. Cl. ........................................................ 162/5; 162/4
[58] Field of Search .............................................. 162/5, 4

[56] References Cited

U.S. PATENT DOCUMENTS

| | | | |
|---|---|---|---|
| 4,162,186 | 7/1979 | Wood et al. | 162/5 |
| 4,561,933 | 12/1985 | Wood et al. | 162/5 |
| 4,618,400 | 10/1986 | Wood et al. | 162/5 |
| 4,820,379 | 4/1989 | Darlington | 162/5 |
| 5,200,034 | 4/1993 | Richmann et al. | 162/5 |
| 5,248,388 | 9/1993 | Richmann et al. | 162/5 |
| 5,259,969 | 11/1993 | Srivasta et al. | 252/60 |
| 5,632,857 | 5/1997 | Larson | 162/5 |

OTHER PUBLICATIONS

Schriver, K.E., "Mill Chemistry . . . Deink Line Decision", Paper Recycling, Nov. 1992, pp. 131–134.

Woodward, T.W, "Appropriate Chemical . . . Deinking Operations", Paper Recyling, Nov. 1992, pp. 154–158.

*Primary Examiner*—Stanley S. Silverman
*Assistant Examiner*—Dean T. Nguyen
*Attorney, Agent, or Firm*—Alexander D. Ricci; Richard A. Paikoff

[57] ABSTRACT

A process for the deinking of wastepaper is disclosed. The process comprises administering a sufficient amount of a branched alcohol alkoxylate surfactant to a sample of waste paper for which treatment is desired. The surfactant is effective for the flotation of the ink.

9 Claims, No Drawings

DEINKING WASTEPAPER CONTAINING ELECTROSTATIC PRINTED INK USING BRANCHED ALCOHOL ALKOXYLATE SURFACTANT

BACKGROUND OF THE INVENTION

Dry toner electrostatic printing inks, including laser and xerographic inks, are important and growing contaminants in the area of wastepaper recycling. Traditionally, paper has been printed with water or oil-based inks which were adequately removed by conventional deinking procedures. In these methods, secondary fiber is mechanically pulped and contacted with an aqueous medium containing a surfactant. Ink is separated from pulp fibers as a result of mechanical pulping and the action of the surfactant. The dispersed ink is separated from pulp fibers by such means as washing or flotation.

Conventional deinking processes have shown minimal success in dealing with dry toner electrostatic printing inks, with the necessary chemical and mechanical treatments of the furnish proving to be time consuming and often rendering a furnish which is unacceptable for many applications. The development of a deinking program for office waste contaminated with electrostatic printed copy will make this furnish more amenable to the recycling process.

The ability to recycle office waste will prove commercially advantageous and will have a significant impact on the conservation of virgin fiber resources. Although electrostatic printed waste has not reached the volume of impact printed waste commonly seen in the industry, indications are such that usage of electrostatic print is increasing steadily and that waste copies available to the recycling industry will also increase.

Some deinking systems employ chemical aggregation and densification followed by forward cleaning to remove nonimpact inks, and flotation deinking to remove impact inks (i.e., offset) and other contaminants. The chemical nature of many of these deinking products has caused them to act as defoamers in aqueous papermaking systems. A separate flotation aid is thus often added to the flotation cell in order to overcome the defoaming effect of the earlier chemicals.

A major difficulty in utilizing mixed office waste as a recycled fiber source is the high level of laser and xerographic ink contaminants. Laser and xerographic inks use dry toner rather than ink. During the process, heat or the combination of heat and pressure are applied to cause the toner particles to fuse to the paper surface and one another. Toner may be removed from the fiber surface by repulping under alkaline conditions. However, the separated particles are flat, plate-like, of varying size, and have a density close to that of water. These inks should be separated from the fiber and reduced to a particle size range that will facilitate removal through mechanical means (e.g., flotation).

A problem in using mixed office waste in a recycle stream is dealing with the extreme pH and temperature adjustments in the pulping sequence, which facilitate release/separation of the laser/xerographic ink particles from the fiber. The present invention allows for the separation of ink particles at lower pulping temperatures and pH levels. Removal of the inks using flotation in turn minimizes water usage and the effluent accumulation seen with washing.

DETAILED DESCRIPTION OF THE INVENTION

The present invention provides a process for the deinking of wastepaper containing electrostatic printed ink, impact printed ink, or combinations thereof, which comprises adding to an aqueous slurry of the wastepaper a nonionic surfactant of the Formula I:

$$R-O-(CH_2CH_2O)_nH \quad (I)$$

wherein:

R is a $C_{10}$ to $C_{15}$ branched alkyl; and n denotes the average number of ethylene oxide units and is a whole or fractional number ranging from about 5 to 8.

Preferred compounds of the Formula I are those wherein R is $C_{11}$ to $C_{14}$ branched alkyl and n is a whole or fractional number of from about 6 to 7.

A branched chain polyethoxylated tridecyl alcohol with a distribution of chain lengths of 11 to 14 carbon atoms (13 carbon unit, or hydrophobe most frequently occurring) and with the general molecular structure $(C_2H_4O)_nC_{13}H_{28}O$ where n=6–7 was found to be particularly effective for flotation of laser/xerographic inks.

Branched alkyl units represent the hydrophobic end of the surfactant and contain carbon atoms with primary, secondary and tertiary carbon-carbon bonds, while a linear alkyl unit, in contrast, contains primary and secondary carbon atoms.

Major hydrophobe isomers are tetramethylnonane, trimethyldecane, and trimethylnonane. Nearly all isomers contain one methyl group in the C-1 position. Product efficacy was evident under pH 5 to 11 and lower temperature (32° to 49° C.) pulping conditions. Treatment levels of at least about 0.25 pound/ton based on the weight of pulp are effective when added to the wastepaper stocks.

The nonionic surfactant of the present invention may have a hydrophile-lipophile balance (HLB) of from about 10–13, with an HLB of from about 11–12 preferred.

In the examples that follow, the branched polyethoxylated tridecyl alcohol (isotridecyl alcohol ethoxylate) described above as particularly effective for flotation of laser/xerographic inks was added to a pulper at varying temperature/pH/ product dosages using a furnish containing a high level of xerographic office waste. After the pulping was complete, the stock was diluted to 1% consistency and ink removed using a flotation cell. It is theorized that the high level of branching for the polyethoxylated tridecyl alcohol enhanced the removal of these difficult inks. The branched chain polyethoxylated tridecyl alcohol was compared to a linear alcohol ethoxylate having the same moles of ethoxylation, similar HLB, and similar molecular weight in an effort to directly compare ink removal efficiency of the two structures.

TABLE I

Branched vs Linear Alcohol Ethoxylate

| | moles of ethoxylation | HLB | alcohol ethoxylated |
|---|---|---|---|
| Branched Isotridecyl Alcohol Ethoxylate | 7 | 11.5 | $C_{11}$–$C_{14}$ $C_{13}$rich |
| Linear Alcohol Ethoxylate | 7 | 12.0 | $C_{12}$–$C_{15}$ |

The branched alcohol ethoxylate and linear alcohol ethoxylate were added to pulpers containing furnish containing primarily xerographically printed office waste under the conditions shown in Table II.

TABLE II

| Pulping Temperature | Pulping pH | #/T | Pulping Consistency[1] | Pulping Time |
|---|---|---|---|---|
| 32° C. and 49° C. | 5, 8 and 11 | 1 and 2#/T as calculated on dry weight of pulp | 5% | 45 min. |

[1]Grams dry fiber per 100 grams slurry.

After deinking/pulping was complete, the stock was diluted to 1% consistency. A two gram pulp pad was formed for evaluation. This was the flotation cell feed. Flotation was performed using a flotation cell at 44° C. for five minutes. Flotation accepts (the material remaining in flotation cell after ink-containing froth has been skimmed off) were formed into two gram filter pads to minimize the dilution/washing effects of handsheet formation.

Product performance with respect to ink removal across the flotation cell was quantified using a standard handsheet analyzer. This system measures dirt/ink in finished paper, board and handsheets with a speck detection range from 63–2600 microns diameter. The performance of the branched alcohol ethoxylate was compared to the linear alcohol ethoxylate and an untreated control at each pH and temperature condition.

At a pulping temperature of 32° C., the branched alcohol ethoxylate showed significant improvements in ink removal efficiency over the linear alcohol ethoxylate at both 1 and 2#/T at pH 5, 8 and 11.

These results are displayed in Tables III and IV.

TABLE III

Removal Efficiency at Pulping Temperature of 32° C.
1#/T Calculated by Dry Pulp Weight

| Treatment Branched vs Linear Alcohol Ethoxylate | Flotation Feed ppm ink 63–2600 microns | Flotation Accepts ppm ink 63–2600 microns | % Removal Across Flotation Cell |
|---|---|---|---|
| Branched pH 5 | 3134 | 136 | 96% |
| Linear pH 5 | 2453 | 462 | 81% |
| Branched pH 8 | 3105 | 214 | 93% |
| Linear pH 8 | 2999 | 822 | 73% |
| Branched pH 11 | 1895 | 657 | 65% |
| Linear pH 11 | 2442 | 2298 | 13% |

TABLE IV

Removal Efficiency at Pulping Temperature of 32° C.
2#/T Calculated by Dry Pulp Weight

| Treatment Branched vs Linear Alcohol Ethoxylate | Flotation Feed ppm ink 63–2600 microns | Flotation Accepts ppm ink 63–2600 microns | % Removal Across Flotation Cell |
|---|---|---|---|
| Branched pH 5 | 2017 | 124 | 94% |
| Linear pH 5 | 2717 | 481 | 83% |
| Branched pH 8 | 3612 | 195 | 95% |
| Linear pH 8 | 3695 | 439 | 86% |
| Branched pH 11 | 2456 | 324 | 87% |
| Linear pH 11 | 2330 | 684 | 72% |

At a pulping temperature of 49° C., the branched alcohol ethoxylate again showed significant improvements in ink removal efficiency over the linear alcohol ethoxylate at both 1 and 2#/T as product at pH 5, 8 and 11. These results are displayed in Tables V and VI.

TABLE V

Removal Efficiency at Pulping Temperature of 49° C.
1#/T Calculated by Dry Pulp Weight

| Treatment Branched vs Linear Alcohol Ethoxylate | Flotation Feed ppm ink 63–2600 microns | Flotation Accepts ppm ink 63–2600 microns | % Removal Across Flotation Cell |
|---|---|---|---|
| Branched pH 5 | 6577 | 292 | 95% |
| Linear pH 5 | 5646 | 5930 | No Removal |
| Branched pH 8 | 2605 | 273 | 90% |
| Linear pH 8 | 6697 | 6257 | 22% |
| Branched pH 11 | 2528 | 1003 | 60% |
| Linear pH 11 | 4883 | 4892 | No Removal |

TABLE VI

Removal Efficiency at Pulping Temperature of 49° C.
2#/T Calculated by Dry Pulp Weight

| Treatment Branched vs Linear Alcchol Ethoxylate | Flotation Feed ppm ink 63–2600 microns | Flotation Accepts ppm ink 63–2600 microns | % Removal Across Flotation Cell |
|---|---|---|---|
| Branched pH 5 | 3666 | 138 | 96% |
| Linear pH 5 | 3466 | 517 | 84% |
| Branched pH 8 | 3533 | 140 | 96% |
| Linear pH 8 | 3453 | 483 | 86% |
| Branched pH 11 | 2169 | 846 | 61% |
| Linear pH 11 | 3032 | 2039 | 35% |

The results of these studies demonstrate that the branched alcohol alkoxylate was significantly more effective than the linear alcohol alkoxylate with respect to the removal of laser/xerographic inks via flotation. This was particularly evident at ambient pH (5 to 8). The branched alcohol ethoxylate tested remained effective at treatment levels as low as about 1 pound/ton based on dry pulp weight, with as much as about 95% ink removal across the flotation cell.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A process for the deinking of wastepaper stocks containing electrostatic printed ink, impact printed ink, or combinations thereof, which comprises the following steps:
   (a) converting the wastepaper to a pulp;
   (b) contacting the pulp with an aqueous medium containing a treatment consisting essentially of a surfactant of the formula:

$$R-O-(CH_2CH_2O)_nH$$

wherein R is a hydrophobic blend of $C_{10}-C_{15}$ branched alkyls including tetramethylnonane, trimethyldecane and trimethylnonane, and n denotes the average number of ethylene oxide units and is a whole or fractional number ranging from about 5 to 8; and
   (c) mechanically processing the resulting pulp-containing medium via flotation to remove treated ink therefrom wherein from about 0.25–2.0 pound/ton of said treatment, based on the weight of said pulp, is added to the wastepaper stocks.

2. The process as recited in claim 1 wherein the HLB of the surfactant is from about 10 to 13.

3. The process as recited in claim 2 wherein said surfactant is a polyethoxylated tridecyl alcohol with a degree of ethoxylation from about 6–7.

4. The process as recited in claim 1 wherein the temperature is from about 30° to 50° C.

5. The process as recited in claim 1 wherein the pH is from 5 to 11.

6. A process for the deinking of wastepaper stocks containing electrostatic printed ink, impact printed ink, or combinations thereof, which comprises the following steps:
   (a) converting the wastepaper to a pulp;
   (b) contacting the pulp with an aqueous medium containing a treatment consisting essentially of a surfactant of the formula:

$$R-O-(CH_2CH_2O)_nH$$

wherein R is a hydrophobic blend of $C_{11}-C_{14}$ branched alkyls including tetramethylnonane, trimethyldecane and trimethylnonane, and n denotes the average number of ethylene oxide units and is a whole or fractional number ranging from about 6 to 7; and
   (c) mechanically processing the resulting pulp-containing medium via flotation to remove treated ink therefrom wherein from about 0.25–2.0 pound/ton of said treatment, based on the weight of said pulp, is added to the wastepaper stocks.

7. The process as recited in claim 6, wherein the HLB of the surfactant is from about 10 to 13.

8. The process as recited in claim 6 wherein the temperature is from about 30° to 50° C.

9. The process as recited in claim 6 wherein the pH is from about 5 to 11.

* * * * *